United States Patent [19]

Takahashi

[11] Patent Number: 4,755,997
[45] Date of Patent: Jul. 5, 1988

[54] COMPUTER PROGRAM DEBUGGING SYSTEM

[75] Inventor: Yuuji Takahashi, Hyogo, Japan

[73] Assignee: Mitsubishi Denki Kabushiki Kaisha, Tokyo, Japan

[21] Appl. No.: 914,319

[22] Filed: Oct. 2, 1986

[30] Foreign Application Priority Data

Oct. 3, 1985 [JP] Japan .................... 60-220521
Nov. 27, 1985 [JP] Japan .................... 60-265041

[51] Int. Cl.⁴ .................................. G06F 11/00
[52] U.S. Cl. .............................. 371/19; 371/12; 371/5
[58] Field of Search .............. 371/12, 13, 5, 7, 9, 371/19, 15, 16, 29, 20, 17, 21, 25; 364/200, 900, 300

[56] References Cited

U.S. PATENT DOCUMENTS

| | | | |
|---|---|---|---|
| 4,308,581 | 12/1981 | Raghunathan | 371/19 |
| 4,482,953 | 11/1984 | Burke | 371/19 |
| 4,538,265 | 8/1985 | Day | 371/12 |
| 4,566,103 | 1/1986 | Sato | 371/12 |
| 4,593,391 | 6/1986 | Mizushima | 371/29 |
| 4,598,402 | 7/1986 | Matsumoto | 371/13 |
| 4,639,917 | 1/1987 | Furuta | 371/16 |
| 4,641,305 | 2/1987 | Joyce | 371/16 |
| 4,661,953 | 4/1987 | Uenkatesh | 371/16 |

Primary Examiner—Michael R. Fleming
Attorney, Agent, or Firm—Bernard, Rothwell & Brown

[57] ABSTRACT

A program debugging system for a computer having an arithmetic/logic controller for implementing operations for data in accordance with a stored program and a program debugging device for issuing commands for correcting program errors to the arithmetic/logic controller, the system comprising a readout data addressing unit incorporated in the program debugging device for specifying the address of data which has caused an error in the arthmetic/logic controller, an address setting memory for writing the address specified by the readout data addressing unit into the arithmetic/logic controller, a data readout commander incorporated in the program debugging device for commanding the readout of the error-causing data in response to the input command issued on an input console provided in the program debugging device, a data hold/transfer unit for reading out data in the address set in compliance with the detection by an error detector in the arithmetic/logic controller and delivering it to a data receive/edit unit in the program debugging device, the data receive/edit unit receiving data from the data hold/transfer unit, editing the received data, and displaying the edited data on a display unit via a display controller.

6 Claims, 5 Drawing Sheets

Fig. 2 (PRIOR ART)
(a)
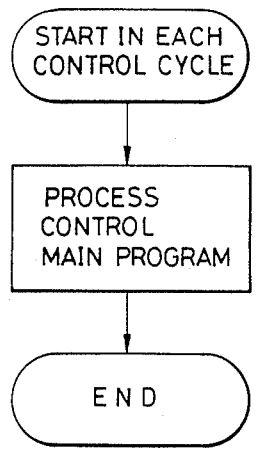
(b)
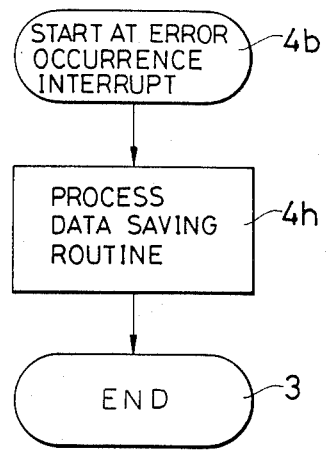
Fig. 3 (PRIOR ART)
```
       POINTER   TIMES   PC     AD
1 CDOPE
2 CDIPE
3 CERR
4 CRPYE
5 CDOPE    1       1    2048   0000
6 PDIPE    2       1    1024   0000
```
- ERROR CAUSE
- ORDER OF ERROR OCCURRENCES
- NUMBER OF ERROR OCCURRENCES
- PROGRAM COUNTER CONTENTS AT ERROR OCCURRENCE
- DATA ADDRESS AT ERROR OCCURRENCE

Fig. 5

| ADDRESS | DATA |
|---------|------|
| MW 10 | 4095 |
| MW 11 | 2176 |
| MW 25 | 6192 |
| IW 0 | 3627 |
| OW 15 | 1225 |

OPERATOR SPECIFIED ADDRESS

READOUT DATA

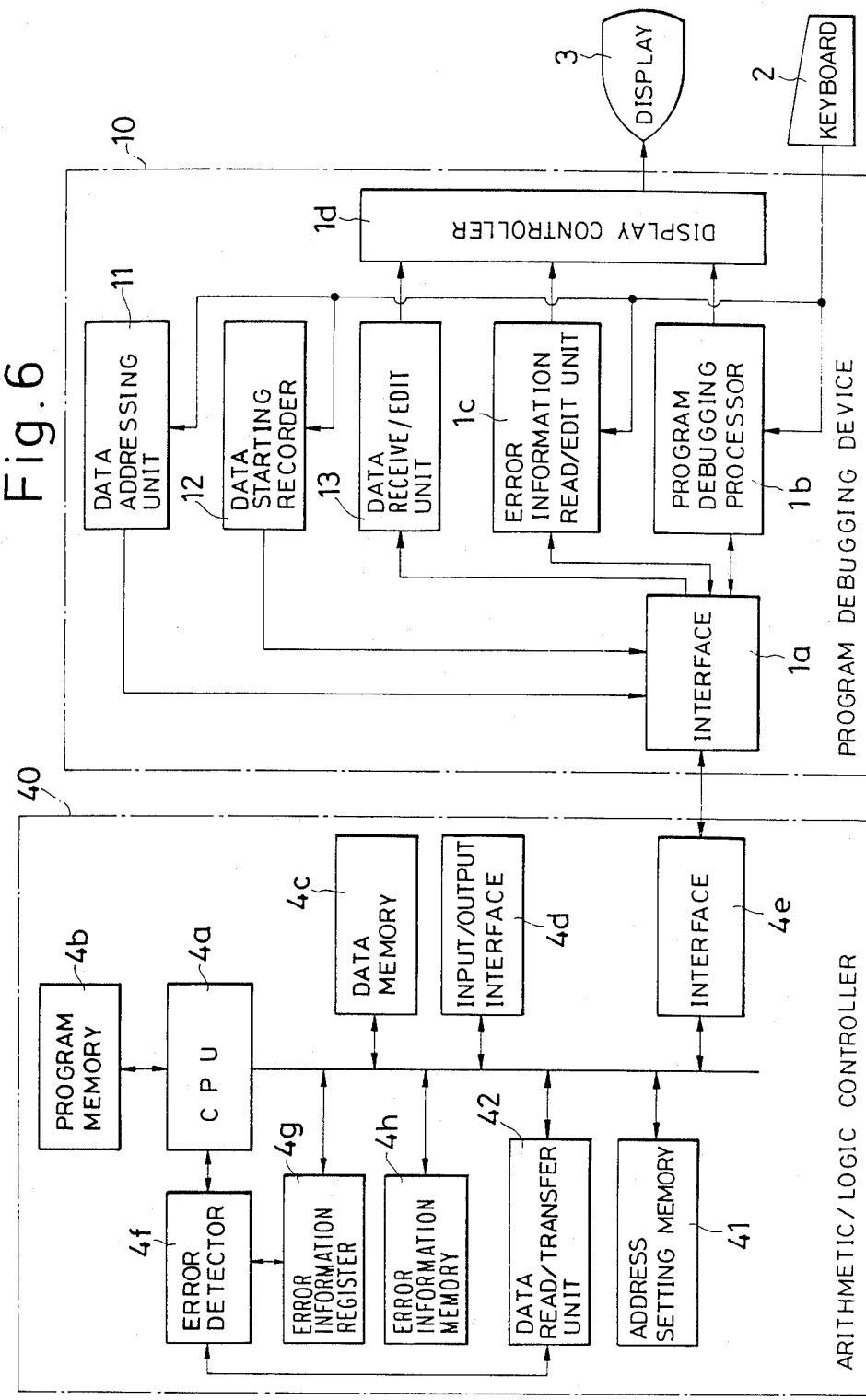

COMPUTER PROGRAM DEBUGGING SYSTEM

BACKGROUND OF THE INVENTION

1. Field of the Invention

The present invention relates to a program debugging system which writes in or modifies computer programs, and more particularly to a program debugging system which is applicable to computers with a stored-program arithmeticlogic controller capable of storing the whole program together with general data.

2. Description of the Prior Art

Recent advanced computer design technology has brought digital computers equipped with a stored-program arithmetic/logic controller. In such computers, when the need of program modification arises, the programmer rewrites the program using a program debugging system which detects errors made in the program rewriting operation and corrects these errors.

FIGS. 1, 2 and 3 show an example of the conventional program debugging system, which is provided in the plant controller "MELPLAC 550" (trade name) manufactured by Mitsubishi Electric Corp., and disclosed in its PP. MTPR instruction manual, p. 83–84.

FIG. 1 shows the arrangement of the above debugging system, in which a program debugging device 1 includes an interface 1a, a program debugging processor 1b, an error information read/edit unit 1c and a display controller 1d. A stored-program arithmetic/logic controller (will be termed simply "arithmetic/logic controller" hereinafter) 4 includes a central processing unit (CPU) 4a, a program memory 4b, a data memory 4c, an input/output interface 4d, an interface 4e, an error detector 4f, an error information register 4g and an error information memory 4h. A keyboard 2 as an operator console is connected to the program debugging device 1, and it has keys for issuing debugging process commands to the program debugging processor 1b and error information readout commands to the error information read/edit unit 1c. A display unit 3 is connected to the output of the display controller 1d.

The interface 1a is connected with the error information read/edit unit 1c and program debugging processor 1b, and also connected with the interface 4e of the arithmetic/logic controller 4 for implementing data transaction between the arithmetic/logic controller 4 and program debugging device 1.

The program debugging processor 1b is activated in response to the debugging process command issued on the keyboard 2, and it operates to convert the debugging process command to the signal to be fed to the arithmetic/ logic controller 4, write a user program into the program memory 4b, and debug the user program during a rewriting operation.

The error information read/edit unit 1c is activated in response to the error information read command from the keyboard 2, and it operates to read out the error information memory 4h and edit the contents. The display controller 1d operates to supply error information edited by the error information read/edit unit 1c.

The CPU 4a implements arithmetic and logic operations and comparison operations for data in accordance with the user program stored in the program memory 4b. The program memory 4b stores the control program as well as user programs. The data memory 4c stores various data processed by the CPU 4a under control of the CPU 4a. The data memory 4c is also capable of temporarily holding the data related to the error in the suitable area for the purpose of analysis of an error which has occurred in the arithmetic/logic controller 4. So as to execute such function, it is necessary to register user programs processing the error related data as an error interrupt routine started at the time of error occurrence to be saved in the data memory 4c.

The error detector 4f detects errors such as overflow of operational result during the execution of operation for data by the CPU 4a, and indicates the occurrence of error to the error information register 4g. The error information register 4g receives the error message from the error detector 4f and stores error information necessary for the error analysis, such as the error code and program address at which the error has occurred, in the error information memory 4h. The error information memory 4h stores error information fed by the error information register 4g.

The input/output interface 4d is to transfer various data between the arithmetic/logic controller 4 and the control object process (not shown). The interface 4e is connected with the interface 1a for implementing data transaction between the arithmetic/logic controller 4 and the program debugging device 1.

The operation of the foregoing program debugging system is as follows. When power is turned on by the operator, the arithmetic/logic controller 4 starts operating as shown in FIG. 2(a). The CPU 4a reads out the program sequentially from the program memory 4b, reads out data from the data memory 4c in accordance with the program, stores data produced as a result of operation in the data memory 4c, reads external data from the control object process (not shown) via the input/output interface 4d, and stores the external data in the data memory 4c. During the execution of the above processes, if the occurrence of error such as overflow of operational result is detected by the error detector 4f and indicated to the error information register 4g, the error code and program address pertinent to that error are recorded by the error information register 4g into the error information memory 4h. At the same time, the occurrence of error is informed to the operator by means of an error indicator lamp (not shown) provided on the arithmetic/logic controller 4. When the operator activates the keys on the keyboard 2 to issue the debugging process command signal, the program debugging processor 1b starts operating as shown in FIG. 2(b). Upon reception of the debugging process command signal by the program debugging processor 1b and delivery in the form of the input signal to the arithmetic/logic controller 4, a debugging process specified by the debugging process command signal, such as correction of error in the user program in the program memory or rewriting of data in the data memory 4c, will take place. Alternatively, when the operator activates the keys on the keyboard 2 to issue the error information read command signal, the error information read/edit unit 1c starts operating. Error information is read out of the error information memory 4h and edited by the error information read/edit unit 1c, and displayed under control of the display controller 1d on the display unit 3 as shown in FIG. 3.

The conventional program debugging system arranged as described above has the following deficiencies. Error detection for such as overflow of operational result occurring in the arithmetic/logic controller 4 is implemented by the error detector 4f as mentioned above, and in this case of the error detecting operation the error detector 4f interrupts the operation of the CPU 4a. Error related data mentioned above at the occurrence of error is indispensable for the debugging process by the program debugging device 1, and it must be held for allowing access by the program debugging device 1. For this purpose of holding error related data, it has been attempted to prepare an error interrupt routine as shown in FIG. 2(b) in the program memory 4b so that the data is saved in a certain area of the data memory 4c and the saved data is retrieved and displayed by the program debugging device 1 on the display unit 3 at the time of error analysis. Because the contents stored automatically in the error information memory 4h merely include the error code and program address at the occurrence of error, and do not include data itself which is conceivably the cause of the error. Recording of detailed data inclusive of data which has directly caused the error in the data memory 4c requires a complex program. Change of address of error related data to be stored in the data memory 4c requires the modification of the error interrupt processing routine, which necessitates rewriting of the error interrupt processing routine in the program memory 4b by suspending the operation of the CPU 4a.

SUMMARY OF THE INVENTION

It is an object of the present invention to provide a program debugging system which eliminates the need of producing an additional complex interrupt processing routine for saving data which has caused an error in the arithmetic/logic controller until the time of error analysis, and yet allows a change in the address of read-out data without suspending the CPU operation thereby to facilitate the error analysis.

The inventive program debugging system is equipped in a computer incorporating the above-mentioned stored-program arithmetic/logic controller and the program debugging device which corrects errors in the program of the arithmetic/logic controller. A data addressing unit which specifies the program address causing an error in the arithmetic/logic controller is provided in the program debugging device, a data read/transfer unit which reads out data of the address specified by the data addressing unit and transfers it to the program debugging device is provided in the arithmetic/logic controller, and a data receive/edit unit which receives data from the data read/transfer unit and edits it for display on the display unit through the display controller is provided in the program debugging device.

BRIEF DESCRIPTION OF THE DRAWINGS

FIG. 2 is a set of flowcharts showing by (a) the normal program process operation, and by (b) the interrupt routine process operation which takes place at the occurrence of an error, both implemented by the system shown in FIG. 1;

FIG. 3 is a diagram showing data displayed on the display unit by the interrupt routine of FIG. 2(b) on the display unit shown in FIG. 1;

FIG. 5 is a diagram showing data displayed on the display unit of the program debugging system of FIG. 4; and FIG. 6 is a block diagram showing another embodiment of this invention.

DETAILED DESCRIPTION OF THE PREFERRED EMBODIMENTS

Figure 1:
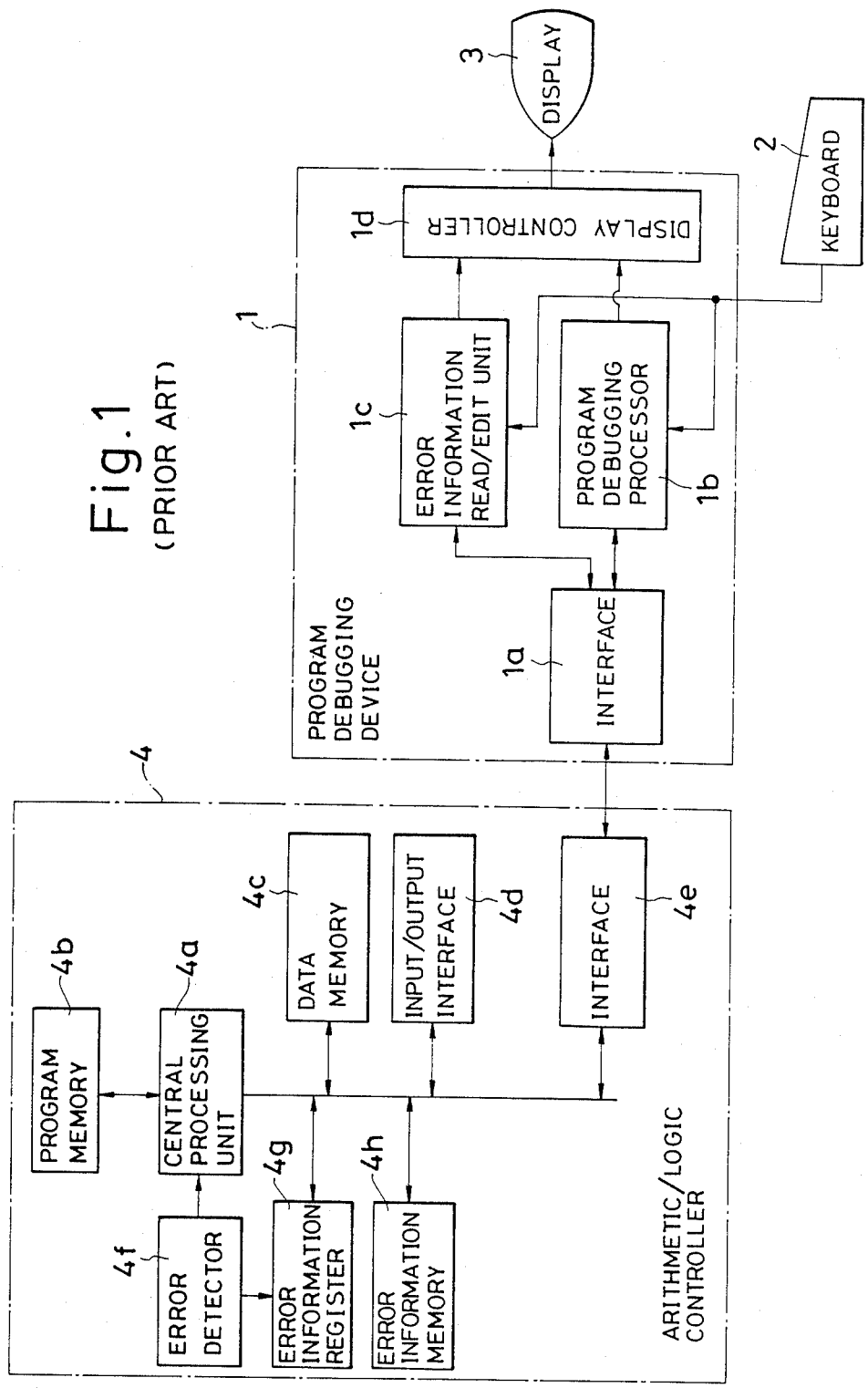
FIG. 1 is a block diagram showing the program debugging system employed in the conventional computer.
Figure 4:
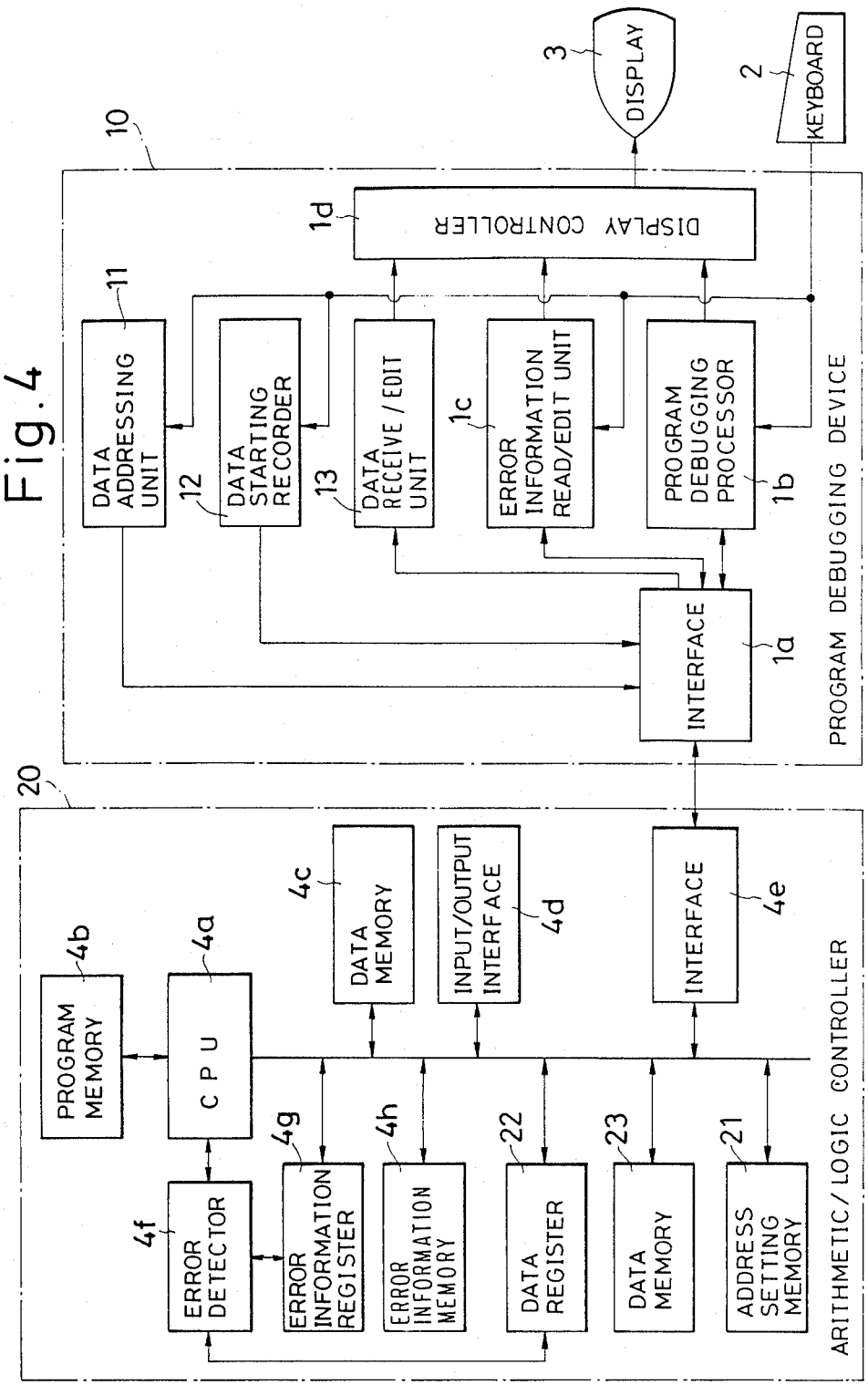
FIG. 4 is a block diagram of the program debugging system embodying the present invention.

Preferred embodiments of the present invention will now be described with reference to the drawings. FIG. 4 shows in block diagram the program debugging system embodying the present invention. In the figure, the components referred to by symbols 1 through 4, 1a through 1d, and 4a through 4h are identical to those shown in FIG. 1, and their explanation will not be repeated here. Since several functional blocks are newly added in the program debugging device 10, the keyboard 2 of the operator console also has additional keys for producing command signals to these blocks. A data addressing unit 11 is provided in the program debugging device 10, and it operates, upon receiving from the keyboard 2 one or more data addresses to be recorded at the occurrence of error, to write the data addresses in the address setting memory 21 within the arithmetic/logic controller 20. A data starting recorder 12 is provided in the program debugging device 10, and it operates, upon receiving from the operator console 2 the data recording command at the occurrence of error, to transfer the signal to data register 22 within the arithmetic/logic controller 20. A data receive/edit unit 13 is provided in the program debugging device 10, and it operates, upon receiving from the keyboard 2 the data read request signal at the occurrence of error, to read out data at the occurrence of error held in an error data memory 23 which is newly provided in the arithmetic/logic controller 20, edit the data, and deliver it to the display controller 1d.

The data register 22 is incorporated in the arithmetic/logic controller 20, and it starts operating in response to the data recording command transferred from the data starting recorder 12. The data register 22 also receives the data read/record request issued by the aforementioned error detector 4f and reads data addressed by the address setting memory 21 out of the data memory 4c or input/output interface 4d into the data memory 23. The data memory 23 holds data read out of the data memory 4c or input/output interface 4d by the data register 22 at the occurrence of error, and it also serves as a data saving memory at the occurrence of error for saving data from the data receive/edit unit 13 until it is accessed. The address setting memory 21 is used to set the data address to be read out and recorded by the data addressing unit 11 at the occurrence of error.

The operation of the program debugging system arranged as described above is as follows. It is assumed that more than one data address to be read out and recorded at the occurrence of error is set in advance in the address setting memory 21 by the data addressing unit 11. During the execution of a program stored in the program memory 4b by the CPU 4a, the operator issues the command using the keyboard 2 to the program debugging device 10, which then starts operating. When the key on the keyboard 2 for producing the data recording command signal is operated, the data starting recorder 12 is activated. This causes the data register 22 to start the data recording operation by receiving the command signal from the data recorder 12. At the same time, when the error is detected by the error detector 4f, it produces the interrupt signal to the CPU 4a, which then suspends the operation. The error detector 4f also produces the recording request signal to the error information register 4g and to the data register 22. Upon delivery of the error information recording request signal to the error information register 4g, it records the error code and program address pertinent to that error in the error information memory 4h. When the data read/record request signal is delivered to the data register 22, data in the data addresses set in the address setting memory 21 are read out of the data memory 4c and input/output interface 4d by the register 22 into the data memory 23. These data recorded in the data memory 23 are read out by the data receive/edit unit 13 in response to the output of the data reading request signal from the keyboard 2, edited by the receive/edit unit 13, and displayed by the display controller 1d on the display unit 3.

Although in the foregoing embodiment the cause of error on the part of the arithmetic/logic controller 20 is not specified, it is also possible to record the cause of error in the data memory 23 only when an error of a specified cause has occurred through the preparation of a debugging program which enables the program debugging device 10 to specify the cause of error. It is also possible to prepare a debugging program which allows the specification of program address range for the program stored in the program memory 4b where errors are likely to occur, so that only errors occurring during the execution of the specified range of program by the CPU 4a are recorded with their causes in the data memory 23.

Although in the above embodiment data in the setting address is read out by the data register 22 into the data memory 23, and then delivered to the program debugging device 10, the inventive system may be arranged to have an address setting memory 41 and data read/transfer unit 42 in the arithmetic/logic controller 40, as shown in FIG. 6, so that the operation implemented by the data register 22 and data memory 23 in the embodiment of FIG. 4 are carried out by the data read/transfer unit.

According to this invention, as described above, the arithmetic/logic controller is operative to hold data in addresses specified in advance by the data addressing unit at the occurrence of error, which eliminates the need for a complex interrupt processing routine for saving data which has caused the error in the arithmetic/logic controller until the time of error analysis, and yet allows a change of readout data address in the continuation of the CPU operation, whereby the cause of error can easily be analyzed.

The inventive system is arranged so that data addresses to be read out at the occurrence of error can be specified by the program debugging device, which eliminates the need of an interrupt processing routine for saving data at the occurrence of error, and allows the readout data address to be changed easily without affecting the control operation of the arithmetic/logic controller.

What is claimed is:

1. A program debugging system for a computer having at least an arithmetic/logic controller for implementing arithmetic/logic operations for data in accordance with a stored program and a program debugging device which issues a command for correcting an error in said program to said arithmetic/logic controller, said program debugging system comprising:
   a readout data addressing unit, incorporated in said program debugging device, for specifying an address of data which a debugging operator desires to read out, in case of occurrence of an error in said arithmetic/logic controller;
   an address setting memory incorporated in said arithmetic/logic controller and operative to write an address specified by said readout data addressing unit;
   a data readout commander incorporated in said program debugging device and operative to command a readout process for said error-causing data at the occurrence of error
   an error detector incorporated in said arithmetic/logic controller;
   a data register incorporated in said arithmetic/logic controller and actuated by an actuation command from said data readout commander and reading out address data which are specified by said address setting memory in accordance with a detected result provided by said error detector, said error detector being connected to said data register;
   said program debugging device including a first interface and said arithmetic/logic controller including a second interface;
   a data memory incorporated in said arithmetic/logic controller for storing data read out by said data register and delivering the data to said program debugging device through said interfaces; and
   said program debugging device including a data receive/edit unit, said data receive/edit unit being operative to receive data sent from said data memory through said interfaces and to edit the data.

2. A program debugging system according to claim 1, wherein said address setting memory, said data register and said data memory all incorporated in said arithmetic/logic controller, and said readout data addressing unit, data readout commander and data receive/edit unit all incorporated in said program debugging device are operative to specify data addresses, commence data readout, and record and transfer data by exchanging digital signals through said interface units.

3. A program debugging system according to claim 1, wherein said arithmetic/logic controller incorporating said address setting memory, data register and data memory is further provided therein with at least a program memory for storing a program, a central processing unit for implementing arithmetic/logic operations for data in accordance with the program in said program memory, said error detector detecting an error in the program, and said data memory storing various data of a control object which is controlled by said computer.

4. A program debugging system according to claim 1, wherein said program debugging device incorporating said readout data addressing unit, data readout commander and data receive/edit unit is provided therein with at least a display controller connected with a display unit for displaying the program and data, said program debugging device further including a program debugging processor, said system further including an input operation unit connected to said program debugging processor for entering debugging commands.

5. A program debugging system according to claim 4, wherein said input operation unit is connected to said program debugging processor, said readout data addressing unit and said data readout commander, and wherein said display controller in connection with said display unit is connected to said program debugging processor and said data receive/edit unit, so that an error in the program is corrected through the operation of said input operation unit while making reference to the program and data displayed on said display unit.

6. A program debugging system for a computer having at least an arithmetic/logic controller for implementing arithmetic/logic operations for data in accordance with a stored program and a program debugging device which issues a command for correcting an error in the program to said arithmetic/logic controller, said program debugging system comprising:

a readout data addressing unit, incorporated in said program debugging device, for specifying an address of data which a debugging operator desires to read out, in case of occurrence of an error in said arithmetic/logic controller;

an address setting memory incorporated in said arithmetic/logic controller and operative to write an address specific by said readout data addressing unit;

a data readout commander incorporated in said program debugging device and operative to command a readout process for said error-causing data at the occurrence of error;

an error detector incorporated in said arithmetic/logic controller;

a data read/transfer unit incorporated in said arithmetic/logic controller and actuated by an actuation command from said data readout commander and reading out address data which are specified by said address setting memory in accordance with a detected result provided by said error detector, said error detector being connected to said data read/transfer unit;

said program debugging device including a first interface and said arithmetic/logic controller including a second interface; and said program debugging device further including a data receive/edit unit, said data receive/edit unit being operative to receive data transferred from said data read/transfer unit through said interfaces and to edit the data.

* * * * *